(12) United States Patent
Guo

(10) Patent No.: US 11,143,622 B2
(45) Date of Patent: Oct. 12, 2021

(54) VIBRATING STRUCTURE, BUBBLE REMOVING STRUCTURE, AND ULTRASONIC LIQUID CONCENTRATION DETECTING DEVICE

(71) Applicant: DONGGUAN ZHENGYANG ELECTRONIC MECHANICAL CO., LTD., Guangdong (CN)

(72) Inventor: Zhenwu Guo, Shenzhen (CN)

(73) Assignee: DONGGUAN ZHENGYAN ELECTRONIC MECHANICAL CO., LTD., Guangdong (CN)

( * ) Notice: Subject to any disclaimer, the term of this patent is extended or adjusted under 35 U.S.C. 154(b) by 129 days.

(21) Appl. No.: 16/605,105

(22) PCT Filed: Apr. 13, 2018

(86) PCT No.: PCT/CN2018/083115
§ 371 (c)(1),
(2) Date: Oct. 14, 2019

(87) PCT Pub. No.: WO2018/188665
PCT Pub. Date: Oct. 18, 2018

(65) Prior Publication Data
US 2020/0158689 A1    May 21, 2020

(30) Foreign Application Priority Data
Apr. 14, 2017   (CN) .......................... 201710243494.X

(51) Int. Cl.
*G01N 29/02*   (2006.01)
*G01N 29/22*   (2006.01)

(52) U.S. Cl.
CPC .......... *G01N 29/02* (2013.01); *G01N 29/222* (2013.01); *G01N 2291/022* (2013.01); *G01N 2291/02809* (2013.01)

(58) Field of Classification Search
CPC ...... G01N 29/02; G01N 29/22; G01N 29/024; G01N 29/032; G01N 29/225; G01N 29/24;
(Continued)

(56) References Cited

U.S. PATENT DOCUMENTS

| | | |
|---|---|---|
| 6,959,589 B1 | 11/2005 | Soong et al. |
| 2010/0162690 A1 | 7/2010 | Hosaka et al. |
| 2015/0089996 A1 | 4/2015 | Reimer et al. |

FOREIGN PATENT DOCUMENTS

| | | |
|---|---|---|
| CN | 106896155 | 6/2017 |
| JP | 63250559 | 10/1988 |

(Continued)

OTHER PUBLICATIONS

International Search Report issued in PCT/CN2018/083115 dated Jul. 5, 2018.
European Search Report issued in 18783875.0 dated Dec. 17, 2020.

*Primary Examiner* — Tarun Sinha
(74) *Attorney, Agent, or Firm* — Workman Nydegger

(57) ABSTRACT

Provided is an ultrasonic liquid concentration detecting device including a vibrating structure, a bubble removing structure, and an ultrasonic detecting main body. The vibrating structure is disposed at the bottom of the ultrasonic detecting main body and is configured to buffer a shock received by the ultrasonic detecting main body. The bubble removing structure is disposed on the ultrasonic detecting main body and is configured to accelerate the flow rate of a liquid. The ultrasonic detecting main body is configured to detect a concentration of the liquid. Further provided are a bubble removing device and a vibrating structure for an ultrasonic liquid concentration detecting device.

19 Claims, 6 Drawing Sheets

(58) Field of Classification Search
CPC ... G01N 2291/022; G01N 2291/02809; G01N 2291/0228; G01N 2291/045; G01N 2291/02433
USPC ........................................................ 73/61.49
See application file for complete search history.

(56) References Cited

FOREIGN PATENT DOCUMENTS

| | | | | |
|---|---|---|---|---|
| JP | H0821825 | | 1/1996 | |
| JP | H0821825 A | * | 8/1996 | ... G01N 2291/02809 |
| JP | 2016151489 | | 8/2016 | |
| TW | 293087 | | 12/1996 | |

* cited by examiner

VIBRATING STRUCTURE, BUBBLE REMOVING STRUCTURE, AND ULTRASONIC LIQUID CONCENTRATION DETECTING DEVICE

CROSS REFERENCE TO RELATED APPLICATIONS

This application is a 371 Application of International Patent Application Number PCT/CN2018/083115, filed Apr. 13, 2018, which claims the benefit of China Patent Application No. 201710243494.X, filed Apr. 14, 2017, the disclosures of both of which are incorporated herein by reference in their entireties.

TECHNICAL FIELD

The present disclosure relates to the technical field of concentration detecting devices, for example, to a vibrating structure, a bubble removing structure, and an ultrasonic liquid concentration detecting device.

BACKGROUND

Diesel engines are widely used in various industries by virtue of their high horsepower. Compared with a gasoline engine, however, the problem of high levels of emission of nitrogen oxides due to nitrogen oxides generated by diesel oil under high temperatures in the cylinder has long been plaguing the industry. As people's environmental protection requirements are yearly going higher, countries around the world have successively legislated to stipulate engine emission standards, advancing the research of exhaust gas treatment technologies by engine manufacturers in various countries.

Nowadays, China has forced the use of National Standard IV engines with the corresponding exhaust gas treatment technologies. Among them, the dominant technical routes in the world are Selective Crystal Reduction (SCR) and Exhaust Gas Recirculation (EGR) plus Diesel Particulate Filter (DPF) technologies, among which SCR is the most mature and universal. Several major engine manufacturers in China have all chosen the SCR system, which uses chemical substances to react with the engine's exhaust substances to produce substances that are harmless to the human body. Urea or urea-based solutions are often used in automotive applications to reduce the emission of harmful substances in automotive exhaust, the main component of which is nitrogen oxides. Chemical reaction equation is as follows:

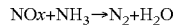

$NOx + NH_3 \rightarrow N_2 + H_2O$ ($N_2$ and $H_2O$ are harmless substances in the natural air).

The SCR system includes a urea tank carrying a diesel engine exhaust gas treatment liquid and an SCR catalytic reaction tank. The operation process of the SCR system is as follows. When nitrogen oxides are found in the exhaust pipe, the urea tank automatically ejects the diesel engine exhaust gas treatment liquid, and the diesel engine exhaust gas treatment liquid and the nitrogen oxides undergo oxidation-reduction reaction in the SCR catalytic reaction tank to generate pollution-free nitrogen and water vapor which are then discharged.

With the full implementation of the National Standard IV or higher vehicle emission standards, all heavy commercial vehicles would have to be equipped with an SCR system or an equivalent post-emission treatment device, and most of the domestic main engine manufacturers choose the SCR system, so the vehicle-use urea must be used. Urea must be kept at a certain range of concentration during use to fully convert nitrogen oxides in the exhaust gas into water and nitrogen. If the concentration of urea in the vehicle-use urea solution is too high, the reaction will be insufficient causing secondary NH3 pollution; otherwise if the concentration of urea is too low, the emission standard cannot be met.

In the future, in line with the enforcement of an On-Board Diagnostic (OBD) system, the vehicle's torque would be restricted or the vehicle may even be restricted from starting causing the vehicle engine to automatically deaccelerate when the emission does not reach the standard, or the diesel engine exhaust gas treatment liquid is not loaded or has an insufficient purity or inferior quality. Furthermore, the diesel engine exhaust gas treatment liquid with an inferior quality may contaminate the catalyst in the SCR catalytic reaction tank, leading to serious consequences. Therefore, with the implementation of the National Standard VI, the urea concentration ultrasonic liquid concentration detecting device would be a compulsory unit.

A related ultrasonic liquid concentration detecting device that measures liquid concentration can determine in real time the concentration or quality of a solution in the cavity where the ultrasonic liquid concentration detecting device is disposed through the coordination of an ultrasonic generating device, an ultrasonic receiving device, and an ultrasonic liquid concentration detecting device control system. However, this device cannot eliminate factors that affect the measurement accuracy during the measurement, for example, an excessive instantaneous impact to the probe when subjected to a shock during the running of the vehicle, damage of the probe, or a reduction of the probe's service life, a high temperature of the measured liquid, or bubbles attached to the ultrasonic generating and receiving surface that are caused by the addition of a liquid, and the like. In particular, in one case where the probe is subjected to a big impact, the problem of a large shift of the measured acoustic wave can arise. In another case, the bubbles can cause significant attenuation of ultrasonic signals. These cases would lead to sound wave shift and signal attenuation resulting in an inaccurate concentration measurement. Therefore the related ultrasonic liquid concentration detecting device can only provide a urea solution concentration measurement that has a low accuracy hence low reliability.

SUMMARY

The present disclosure provides an ultrasonic liquid concentration detecting device, which protects an ultrasonic generating device and a probe of the ultrasonic liquid concentration detecting device, prolongs the service life of the probe of the ultrasonic liquid concentration detecting device, and improves the precision of the ultrasonic liquid concentration detecting device.

The present disclosure further provides a vibrating structure for an ultrasonic liquid concentration detecting device. The vibrating structure directs the external vibration energy and amplifies the vibrating amplitude of the probe.

The present disclosure also provides a bubble removing structure for an ultrasonic liquid concentration detecting device, which reduces or removes bubbles, thereby reducing the attenuation of ultrasonic signals arising from increased bubbles and improving the detecting precision.

There is provided ultrasonic liquid concentration detecting device that includes a vibrating structure, a bubble removing structure, and an ultrasonic detecting main body.

The vibrating structure is disposed at the bottom of the ultrasonic detecting main body and is configured to buffer the oscillation received by the ultrasonic detecting main body.

The bubble removing structure is disposed on the ultrasonic detecting main body and is configured to accelerate a flow rate of a liquid.

The ultrasonic detecting main body is configured to detect a concentration of the liquid.

Optionally, the vibrating structure includes an upper connecting surface joined with a bottom surface of a probe mounting base, a lower connecting surface integrated with the ultrasonic liquid concentration detecting device, and three elastic sheets connected end to end. The elastic sheets are arranged in a stack form, and ends of the three elastic sheets are connected together through locking screws making the three elastic sheets form a firm whole. Each elastic sheet is provided with an elastic region, and the elastic region is provided with a clearance hole and an elastic curvature which are configured for adjusting an elastic coefficient of the elastic sheet.

Optionally, the ultrasonic detecting main body includes a probe of an ultrasonic emitting and receiving device. The probe includes an ultrasonic generator base, an ultrasonic generator, a sealing ring, an ultrasonic generator compressing disc, an ultrasonic reflective sheet, a column, and a signal transmission line.

Optionally, the ultrasonic generator base and the ultrasonic generator are integrated together by injection molding, and the signal transmission line is integrated in the ultrasonic generator base.

Optionally, the ultrasonic generator base and the column are made of a same material thus maintaining a same thermal expansion coefficient after the ultrasonic generator base and the column are connected and secured to each other. The signal transmission line is made of a material resistant to a high temperature of 150 to 300° C. so as to avoid melting during a molding operation. The ultrasonic reflective sheet is embedded in the column and is made of stainless steel. A reflective surface of the ultrasonic reflective sheet is polished, preventing the reflective surface from turning rough due to rusting after being immersed in a solution for a long time which otherwise results in attenuation of reflected signals.

Optionally, the non-reflective surface of the ultrasonic reflective sheet increases an adhesive force in injection molding by increasing the grooves, preventing formation of double-wave diffraction and interference during reflection of ultrasonic waves which otherwise causes signal attenuation.

Optionally, the bubble removing structure includes a flow guidance and ejection part, which comprises a funnel inlet, a flow guiding inlet, a flow guidance channel, an ejection outlet, and a weld line. The flow guidance and ejection part includes two first flow guidance and ejection portions disposed at the top and the bottom of the ultrasonic liquid concentration detecting device respectively and two second flow guidance and ejection portions disposed at the top and the bottom of the ultrasonic liquid concentration detecting device respectively. The ejection outlets of the two first flow guidance and ejection portions both aim at the ultrasonic emitting/receiving surface of the ultrasonic generator, and the ejection outlets of the two second flow guidance and ejection portions both aim at the reflective surface of the ultrasonic reflective sheet.

Optionally, the flow guidance and ejection part and the column are welded together. A rectangular opening is defined in the surface of the column along an axis of the column thus providing a liquid output channel when the flow guidance and ejection part ejects the liquid.

Optionally, each of the first and second flow guidance and ejection portions is funnel-shaped. The caliber of the flow guiding inlet of the funnel-shaped flow guidance and ejection part is small, and the caliber of the funnel inlet of the funnel-shaped flow guidance and ejection part is large. The flow guidance channel is coplanar with the funnel inlet of the funnel-shaped flow guidance and ejection part on three planes, allowing the guided liquid to enter the flow guidance channel from the flow guiding inlet. The ejection outlet is formed in a trumpet shape relative to the flow guidance channel thus forming a flared trumpet-shaped outlet, so that resistance in the flow guidance channel is suddenly released increasing the flow rate of the liquid.

There is further provided a vibrating structure that includes an upper connecting surface joined with a bottom surface of a probe mounting base, a lower connecting surface integrated with the ultrasonic liquid concentration detecting device, and three elastic sheets connected end to end.

The three elastic sheets are connected end to end in a stack form, and ends of the three elastic sheets are connected together through locking screws to form a firm whole body.

Each of the three elastic sheets is provided with an elastic region, and the elastic region is provided with corresponding a clearance hole and an elastic curvature which are configured to adjust the elastic coefficient of the elastic sheet.

There is further provided a bubble removing structure that includes a flow guidance and ejection part, the flow guidance and ejection part including first flow guidance and ejection portions and second flow guidance and ejection portions.

The first flow guidance and ejection portions each include a first funnel inlet, a first flow guiding inlet, a first flow guidance channel, a first ejection outlet, and a weld line. The second flow guidance and ejection portions each include a second funnel inlet, a second flow guiding inlet, a second flow guidance channel, a second ejection outlet and a second weld line.

The outlets of the first flow guidance and ejection portion disposed above the ultrasonic liquid concentration detecting device and the first flow guidance and ejection portion disposed below the ultrasonic liquid concentration detecting device both aim at an ultrasonic emitting/receiving surface of the ultrasonic generator.

The outlets of the second flow guidance and ejection portion disposed above the ultrasonic liquid concentration detecting device and the second flow guidance and ejection portion disposed below the ultrasonic liquid concentration detecting device both aim at a reflective surface of the ultrasonic reflective sheet.

The ultrasonic liquid concentration detecting device according to the present disclosure protects an ultrasonic generating device and a probe of the ultrasonic liquid concentration detecting device, prolongs the service life of the probe of the ultrasonic liquid concentration detecting device, and improves the precision of the ultrasonic liquid concentration detecting device.

BRIEF DESCRIPTION OF DRAWINGS

The present disclosure will be further described in detail in connection with the drawings and embodiments.

In FIGS. 1 to 13:

1. Probe; 11. Ultrasonic generator; 12. Sealing ring; 13. Ultrasonic reflective sheet; 14. Column; 15. Compressing disk; 16. Signal transmission line; 17. Ultrasonic generator base; 18. Groove; 111. Reflecting/receiving surface; 131. Reflective surface; 141. First window; 142. Second window; 143. Liquid output channel;

2. Vibrating structure; 21. Upper connecting surface; 22. Locking screw; 23. Elastic region; 24. Lower connecting surface; 25. Elastic curvature; 26. Elastic sheet; 27. Clearance hole;

3. Probe mounting base;

4. First flow guidance and ejection portion; 41. First funnel inlet; 42. First flow guiding inlet; 43. First flow guidance channel; 44. First ejection outlet; 45. First weld line;

5. Second flow guidance and ejection portion; 51. Second funnel inlet; 52. Second flow guiding inlet; 53. Second flow guidance channel; 54. Second ejection outlet; 55. Second weld line

DETAILED DESCRIPTION

Embodiments of the present disclosure provide an ultrasonic liquid concentration detecting device, which protects an ultrasonic generating device and a probe of the ultrasonic liquid concentration detecting device, prolongs the service life of the probe of the ultrasonic liquid concentration detecting device, and improves the precision of the ultrasonic liquid concentration detecting device.

Figure 1:
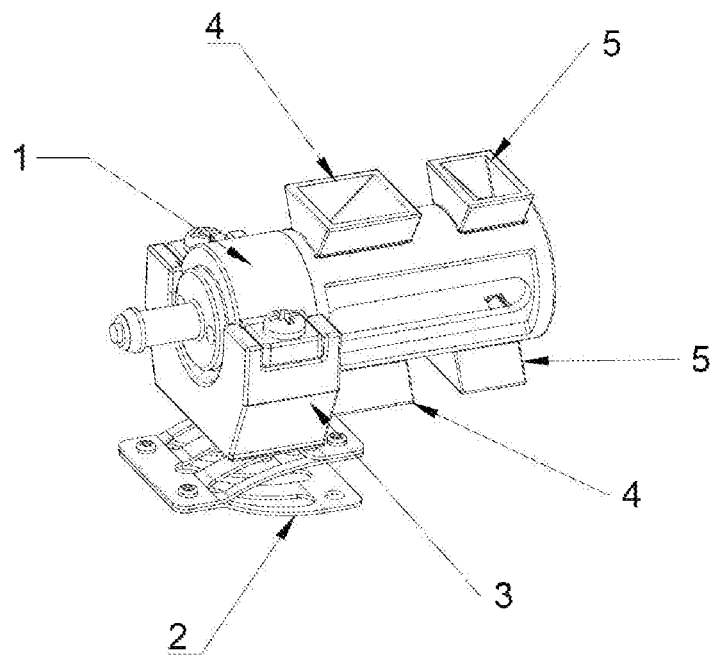
FIG. 1 is an assembly view of an ultrasonic liquid concentration detecting device according to one embodiment.
Figure 2:
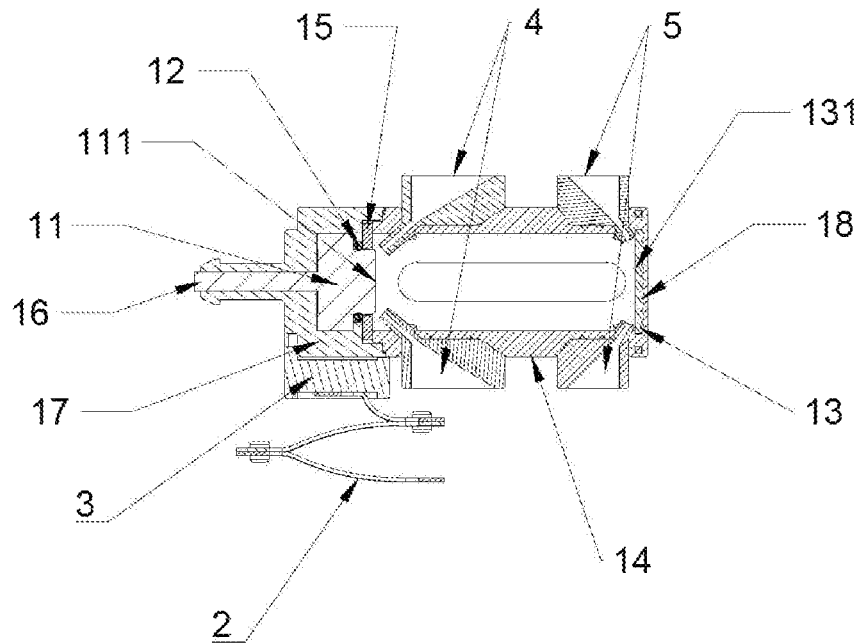
FIG. 2 is a sectional view of a detecting region of an ultrasonic liquid concentration detecting device according to one embodiment.
Figure 3:
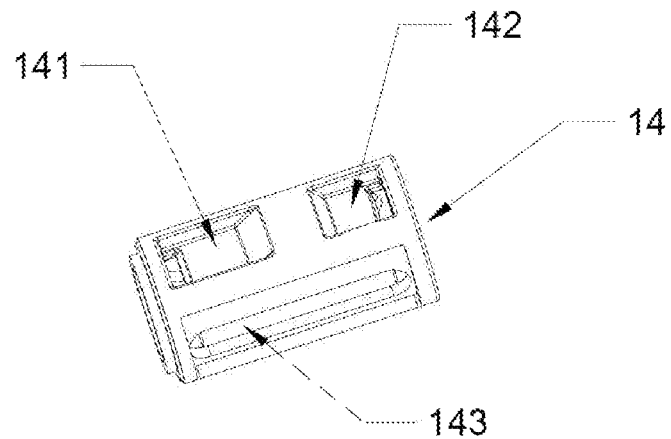
FIG. 3 is a schematic view of a column of an ultrasonic liquid concentration detecting device according to one embodiment.

As illustrated in FIGS. 1 to 3, an ultrasonic liquid concentration detecting device includes an ultrasonic detecting main body, and a probe 1 constituting an ultrasonic emitting and receiving device. The probe 1 includes an ultrasonic generator base 17, an ultrasonic generator 11, a sealing ring 12, an ultrasonic generator compressing disc 15, an ultrasonic reflective sheet 13, a column 14 and a signal transmission line 16.

Optionally, the ultrasonic generator base 17 is integrated with the ultrasonic generator 11 by injection molding, while the signal transmission line 16 of the ultrasonic generator 11 is integrated in the ultrasonic generator base 17.

Optionally, the ultrasonic generator base 17 and the column 14 are made of the same material, and the thermal expansion coefficients of the ultrasonic generator base 17 and the column 14 after they are connected and secured to each other are kept the same.

Optionally, the signal transmission line 16 is made of a material resistant to a high temperature of 150 to 300° C., so as to avoid melting during molding.

Optionally, a new material may be developed or selected after consulting with a professional manufacturer, or a heat-resistant material may be wrapped during injection molding to protect the original lead of the ultrasonic generator 11.

Optionally, an ultrasonic weld line is designed at the interface between the ultrasonic generator base 17 and the column 14, and the ultrasonic generator base 17 and the column 14 are connected to each other by ultrasonic welding.

Optionally, the ultrasonic reflective sheet 13 is embedded in the column 14. The ultrasonic reflective sheet 13 is made of stainless steel, and the reflective surface 131 needs to be polished, preventing the reflective surface from turning rough due to rusting after being immersed in a solution for a long time which otherwise would results in attenuation of reflected signals.

Optionally, the non-reflective surface of the ultrasonic reflective sheet 13 may be provided with grooves 18 thereby increasing an adhesive force in injection molding, so that the signal attenuation caused by the formation of double-wave diffraction and interference during ultrasonic reflection is avoided.

In the ultrasonic liquid concentration detecting device of the present embodiment, the ultrasonic reflective sheet 13 is made of stainless steel, the reflective surface 131 of the ultrasonic reflector 13 is polished, and the non-reflective surface of the ultrasonic reflector 13 is designed as additionally provided with the groove 18, so that noise such as signal interference and diffraction caused by signal double reflection is avoided, and ultrasonic signals are prevented from being attenuated.

In the ultrasonic liquid concentration detecting device of the present embodiment, the ultrasonic generator base 17, the ultrasonic generator 11 and the signal transmission line 16 of the ultrasonic generator 11 are integrated together through injection molding, and the signal transmission line 16 is made of a high-temperature-resistant material, so that the ultrasonic generator is protected. In addition, through the hermetic design of the sealing ring 12 and the sealing ring compressing disc 15, the ultrasonic generator is structurally ensured not to be soaked by corrosive liquids so that an electronic circuitry is prevented from being damaged.

In the ultrasonic liquid concentration detecting device of the present embodiment, the ultrasonic generator base 17 and the column 14 are made of the same material to keep the same thermal expansion coefficient of the two materials, and the ultrasonic generator base 17 and the column 14 are made by the ultrasonic welding process and the like, so that the structural stress of the ultrasonic liquid concentration detecting device is reliable and the use tolerance is high from the material and process perspective, and the service life of the probe is prolonged.

The present embodiment provides a vibrating structure of an ultrasonic liquid concentration detecting device. The vibrating structure provides a buffer to a vibration occurring to the ultrasonic liquid concentration detecting device when the vehicle jolts during driving. The vibrating structure can relieve and guide external oscillation energy, thereby reducing the direct impact on the probe of the ultrasonic liquid concentration detecting device. The use tolerance of the probe of the ultrasonic liquid concentration detecting device is improved, and the service life of the probe is prolonged. The vibrating structure can reduce the instantaneous displacement speed of the probe, so as to achieve a maximum probe receiving area as likely as possible in the transmission direction and during the effective transmission times of the ultrasonic waves. The vibrating structure is used for guiding the direction of external oscillation energy and amplifying the vibrating amplitude of the probe.

A vibrating structure, called a vibrating body 2, is used in an ultrasonic liquid concentration detecting device and includes an upper connecting surface 21 joined with the bottom surface of a probe mounting base 3, a lower connecting surface 24 connected to the ultrasonic liquid concentration detecting device to form a whole, and three elastic sheets 26 connected end to end.

The three elastic sheets 26 are connected end to end to form a stack, and the ends of the three elastic sheets 26 are connected together through locking screws to form a firm whole Optionally, the locking screw 22 is an anti-reverse screw that remains tightened under frequent shocks.

Optionally, the three elastic pieces 26 are locked by the locking screws through double screws, and the sufficient width of the elastic sheets can ensure that the probe oscillates up and down as much as possible. Optionally, the elastic region 23 of each of the three elastic sheets 26 is provided with corresponding a clearance hole 27 and an elastic curvature 25 for adjusting the elastic coefficient of the elastic sheet.

Optionally, the elastic curvature 25 provides a corresponding up-and-down vibrating space in the vertical direction, while the horizontal space required by the probe 1 due to the required vibrating amplitude can be saved.

Alternatively, the elastic curvature 25 may reduce the thickness of the material while maintaining the same elastic coefficient.

Optionally, the direction of the elastic curvature 25 of the elastic region 23 on the middle layer is designed as opposite to that on the bottom layer, avoiding the interference between the elastic regions.

Optionally, the elastic curvature 25 of the top layer of the elastic region 23 is greater than the elastic curvatures of the middle and bottom layers of elastic region 23.

In the vibrating structure of the ultrasonic liquid concentration detecting device according to the present embodiment, three layers of elastic sheets 26 of the vibrating body 2 are designed, so that the phenomenon in which the jolting energy of a car driving on a road is directly conducted to the ultrasonic probe 1 is avoided, the direct impact on the probe 1 is reduced, and the service life of the probe 1 is prolonged.

According to the vibrating structure of the present embodiment, the vibrating body 2 adopts a wide-body design, so that the probe 1 can be inhibited from oscillating left and right, and the probe 1 is guided to mainly generate vertical motion. Therefore, the energy generated by up-and-down jolting energy of an automobile in a main vibration mode on a road is conducted to the probe 1, and the oscillation energy accumulation of the probe 1 in the vertical direction is achieved.

The vibrating structure of the ultrasonic liquid concentration detecting device of the present embodiment and the design of the three layers of elastic sheets 26 of the vibrating body 2 provide enough vibrating amplitude. And by combining the vertical energy accumulation caused by the wide-body design of the vibrating body 2, the oscillation amplitude of the probe 1 in the vertical direction reaches the maximum value of the design amplitude by the combined force of the two, and the vibrating speed is increased.

The present embodiment provides a bubble removing structure for an ultrasonic liquid concentration detecting device, which realizes a local liquid running channel. The channel structure can make liquid to flow at an accelerated speed in the channel, and the liquid is ejected, at a channel outlet, to an ultrasonic generator emitting/receiving surface and an ultrasonic reflective surface. Bubbles caused by temperature rise and liquid addition are retained on the surface to be washed, so that the bubbles are reduced or removed, the attenuation of ultrasonic signals increased due to the bubbles is reduced, and the detecting precision is improved.

The bubble removing structure of the ultrasonic liquid concentration detecting device includes first flow guidance and ejection portions 4 disposed above and below the ultrasonic liquid concentration detecting device respectively and second flow guidance and ejection portions 5 respectively disposed above and below the ultrasonic liquid concentration detecting device respectively. The ejection outlets of the two first diversion ejection parts 4 both aim at the ultrasonic emitting/receiving surface 111 of the ultrasonic generator. The ejection outlets of the two second diversion ejection parts 5 both aim at the reflection surface 131 of the ultrasonic reflection sheet.

Each of the first flow guidance and ejection portions 4 is composed of a first funnel inlet 41, a first flow guiding inlet 42, a first flow guidance channel 43, a first ejection outlet 44, and a first weld line 45, where the first weld line 45 is an interface between the first flow guidance and ejection portion 4 and the column 14.

Each of the second flow guidance and ejection portions 5 is composed of a second funnel inlet 51, a second flow guiding inlet 52, a second flow guidance channel 53 and a second ejection outlet 54, and a second weld line 55, where the second weld line 55 is an interface between the second flow guidance and ejection portion 4 and the column 14.

The first flow guidance and ejection portions 4 and the second flow guidance and ejection portions 5 are welded to the column 14.

Optionally, the first funnel inlet 41 of the first flow guidance and ejection portion 4 has a larger caliber than that of the second funnel inlet 51 of the second flow guidance and ejection portion 5. Because the position where the vibrating body 2 is installed can cause the second flow guidance and ejection portion 5 to be far away from the fulcrum of oscillation, and the amplitude of oscillation is larger than that of the first flow guidance and ejection portion 4. Therefore, in order to ensure that the first flow guidance and ejection portion 4 has enough ejection speed as the second flow guidance and ejection portion 5, the funnel caliber of the first flow guidance and ejection portion 4 needs to be enlarged.

Optionally, the welding interface is two first windows 141 for inserting the first flow guidance and ejection portions 4 and two second windows 142 for inserting the second flow guidance and ejection portions 5 are formed in the vertical direction of the column 14. Optionally, the two first windows 141 are located respectively above and below the ultrasonic liquid concentration detecting device, and the two second windows 142 are respectively located above and below the ultrasonic liquid concentration detecting device. The first window 141 is formed by butt-welding the first welding line 45 and the first window hermetic region. The second window 142 is formed by butt-welding the second welding line 55 and the second window hermetic region. The welding directions are vertical, the first ejection outlet 44 and the second ejection outlet 54 are disposed along the radial direction of the vertical column 14 and are both directed to the axis of the vertical column 14.

Optionally, a rectangular opening is formed in the surface of the column 14 along an axis of the column 14 to form a liquid output channel 143, so that the liquid output channel is provided when the flow guidance and ejection part is ejecting liquid.

Optionally, the first flow guidance and ejection portions 4 is each a funnel-shaped interface, the caliber of the first flow guiding inlet 42 is small, and the caliber of the first funnel inlet 41 is large.

Optionally, the second flow guidance and ejection portions 5 is each a funnel-shaped interface, the caliber of the second flow guiding inlet 52 is small, and the caliber of the second funnel inlet 51 is large.

Optionally, the first flow guidance channel 43 is coplanar with the first funnel inlet 41 on three planes, so that liquid can be smoothly directed from the first flow guiding inlet 42 into the first flow guidance channel 43.

Optionally, the second flow guidance channel 53 is coplanar with the second funnel inlet 51 on three planes, so that liquid can be smoothly directed from the second flow guiding inlet 52 into the second flow guidance channel 53.

Optionally, the shape of the first ejection outlet 44 is matched with that of the first flow guidance channel 43 to form a tiny flared outlet, so that resistance in the first flow guidance channel 43 is suddenly released, and the flow speed of liquid is increased.

Optionally, the shape of the second ejection outlet 54 is matched with that of the second flow guidance channel 53 to form a tiny flared outlet, so that resistance in the second flow guidance channel 53 is suddenly released, and the flow speed of liquid is increased.

There is further provided a bubble removing device for an ultrasonic liquid concentration detecting device according to the present embodiment, which includes first flow guidance and ejection portions 4 and second flow guidance and ejection portions 5. The first and second flow guidance and ejection portions each have a funnel-shaped structure, the flow guiding inlet of the flow guidance and ejection portion has a small caliber while the funnel inlet has a large caliber, and the flow guidance channel of the flow guidance and ejection portion and the funnel inlet of the flow guidance and ejection portion are coplanar on three planes, so that the guided liquid smoothly enters the flow guidance channel from the flow guiding inlet. A tiny flared trumpet-shaped outlet is formed at the ejection outlet of the flow guidance and ejection portion so that resistance in the flow guidance channel is suddenly released and the flow speed of the liquid is increased. Due to these factors, the flow of the liquid in the first flow guidance and ejection portions 4 and the second flow guidance and ejection portions 5 is accelerated, so that bubbles on the reflecting/receiving surface 111 of the ultrasonic generator 11 and the reflective surface 131 of the ultrasonic reflector 13 are washed away and thus removed and the ultrasonic-signal attenuation caused by the bubbles is avoided.

An ultrasonic liquid concentration detecting device includes an ultrasonic liquid concentration detecting device probe 1, a probe mounting base 3, a vibrating structure, first flow guidance and ejection portions 4 and second flow guidance and ejection portions 5. The vibrating structure in the present embodiment is the vibrating structure 2.

The probe 1 is designed as an integrated engineered plastic part, and the core part of the ultrasonic liquid concentration detecting device, namely the ultrasonic generator 11, is wrapped by the engineered plastic. The ultrasonic reflective sheet 13, which is a key functional part of the ultrasonic liquid concentration detecting device, is embedded into the column 14.

Optionally, the ultrasonic generator 11 is injection molded by an engineered plastic through an embedded mold, and embedded into the ultrasonic generator base 17. The tail signal transmission line 16 of the ultrasonic generator is also embedded into the ultrasonic generator base 17. The column 14 is also injection molded by an embedded mold, and the embedded hardware material is the ultrasonic reflective sheet 13.

The column 14 embedded with the ultrasonic reflective sheet 13 and the ultrasonic generator base 17 wrapped with the ultrasonic generator 11 are disposed by an ultrasonic welding tool, welded by an ultrasonic heating process and finally connected into a whole. Thus, the core functional electronic elements of the ultrasonic solution concentration detecting device are integrated in the probe 1, and the emission, transmission, reflection and reception of ultrasonic waves are realized.

The probe 1 is connected to the probe mounting base 3 by means of screw locking.

Optionally, in the horizontal direction of the probe 1, two wings extending outwards are disposed on two sides of the ultrasonic generator base 17, female groove for receiving the two wings of the probe 1 are disposed on two sides of the two wings and the probe mounting base 3, and the two wings and the female groove are matched with each other in a male-female mode. On the basis of the matching of the male and female grooves, the male and female grooves are locked through self-tapping screws. Therefore, an intermediate link connected with the outside is provided through the probe mounting base 3, the future serialization design of the product can be flexibly realized, and meanwhile, a fastening interface of the probe 1 in the ultrasonic liquid concentration detecting device is also provided.

The bottom surface of the mounting base 3 is designed with a plane for mounting the vibrating body 2. The upper connecting surface 21 of the vibrating body 2 is fastened by an anti-reverse double screw on the bottom surface of the mounting base, and the lower connecting surface 24 below the vibrating body 2 is also connected to a base fixing plate of the ultrasonic liquid concentration detecting device through two anti-reverse screws. Thus, the probe 1, the probe mounting base 3 and the vibrating body 2 are connected with the ultrasonic liquid concentration detecting device into a whole.

Figure 4:
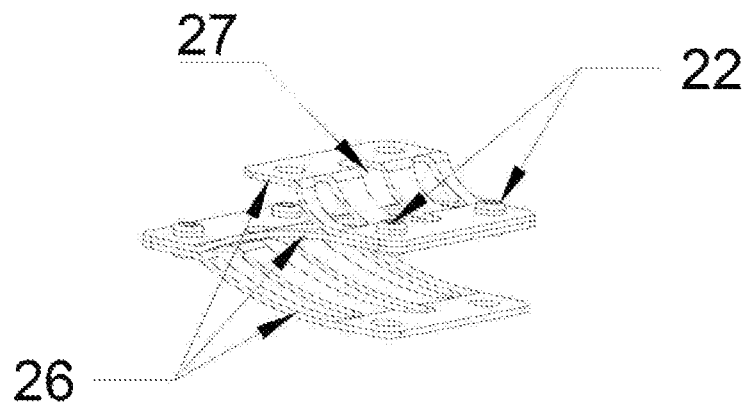
FIG. 4 is a schematic view of a vibrating structure of an ultrasonic liquid concentration detecting device according to one embodiment.
Figure 5:
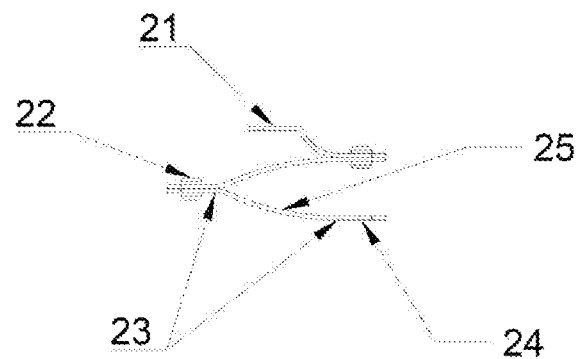
FIG. 5 is a side view of a vibrating structure of an ultrasonic liquid concentration detecting device according to one embodiment.
Figure 6:
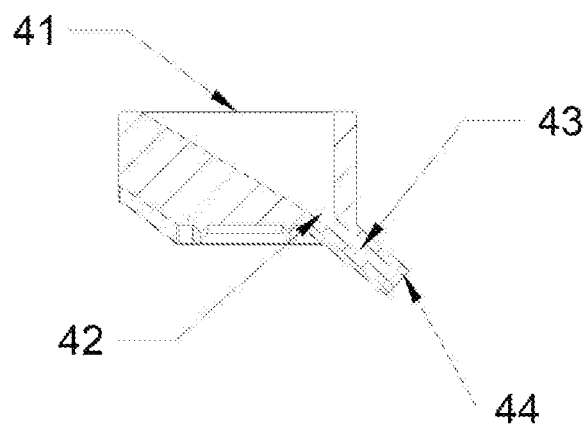
FIG. 6 is a sectional view of a flow guidance and ejection part of an ultrasonic liquid concentration detecting device according to one embodiment.

As illustrated in FIGS. 4 and 5, the overall structure of the vibrating structure 2 includes three elastic sheets 26, and locking screws 22 connecting the three elastic sheets. Optionally, the locking screw is an anti-reverse screw.

Optionally, the three elastic sheets are formed by precision cold stamping the same stainless steel material. The upper layer, the middle layer and the bottom layer are all formed by a stamping process through a cold punching die. Optionally, the process includes blanking, punching, stamping, shaping, or the like.

All three elastic sheets 26 are tightened by anti-reverse screws, so that an integral vibrating body 2 is formed. It should be noted that, when connecting the three elastic sheets 26, the direction of the elastic sheets 26 should be noted so as to avoid the mutual interference of the elastic regions 23 of the elastic sheets 26.

As illustrated in FIGS. 6 to 9, four flow guidance and ejection parts are distributed at the top and the bottom of the probe 1 of the ultrasonic liquid concentration detecting device in the vertical direction. The first flow guidance and ejection portions 4 close to an ultrasonic generator 11 are designed as slightly larger, the second flow guidance and ejection portions 5 close to an ultrasonic reflector 13 are designed as slightly smaller, and the four flow guidance and ejection parts and the probe 1 are connected into a whole on a column 14.

Optionally, the first flow guidance and ejection portions 4 and the second flow guidance and ejection portions 5 are both funnel-shaped. The main body of the flow guidance and ejection portion is a funnel area, and the tail part of the flow guidance and ejection portion includes a flow guidance channel and an ejection outlet. Optionally, the first flow guidance and ejection portion 4 includes a first funnel inlet 41, a first flow guiding inlet 42, a first flow guidance channel 43, a first ejection outlet 44 and a first weld line 55. The second flow guidance and ejection portion 5 includes a second funnel inlet 51, a second flow guiding inlet 52, a second flow guidance channel 53, a second jet outlet 54 and a second weld line 55. The flow guidance and ejection part is made of the same material as the column 14 and is made through an injection molding process. A liquid flow channel in the whole flow guidance and ejection part is designed into a structure with a large upper part and a small lower part, so that the flow guidance and ejection part can be conveniently made by adopting a mold core-pulling mode during molding.

Figure 7:
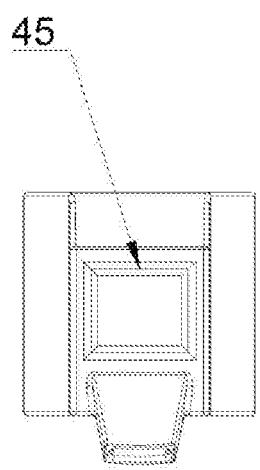
FIG. 7 is a schematic view of a flow guidance and ejection part of an ultrasonic liquid concentration detecting device according to one embodiment.
Figure 8:
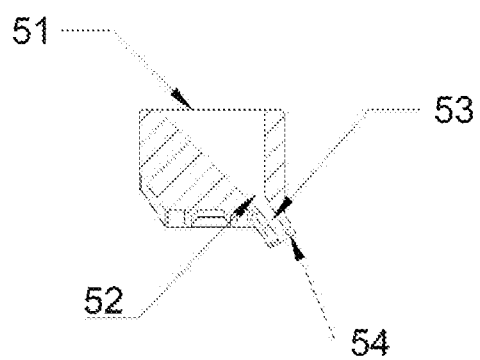
FIG. 8 is a sectional view of a flow guidance and ejection part of an ultrasonic liquid concentration detecting device according to one embodiment.
Figure 9:
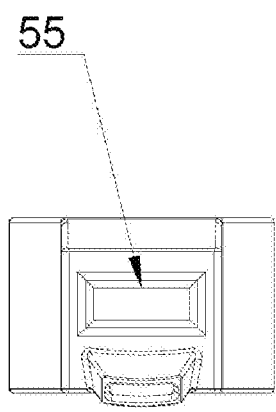
FIG. 9 is a schematic view of a flow guidance and ejection part of an ultrasonic liquid concentration detecting device according to one embodiment.

As illustrated in FIGS. 7 and 9, the bottom of the funnel area of each of the first flow guidance and ejection portions 4 and the second flow guidance and ejection portions 5 of the ultrasonic liquid concentration detecting device is designed as a curved surface attached to the outer part of the column 14. The vertical downward and the ascending direction of curved surface have been designed with a weld line made by ultrasonic welding, and so the welding of two flow guidance and ejection parts of the same type can be achieved through the ultrasonic welding tool positioning mode and heating ultrasonic energy.

Figure 10:
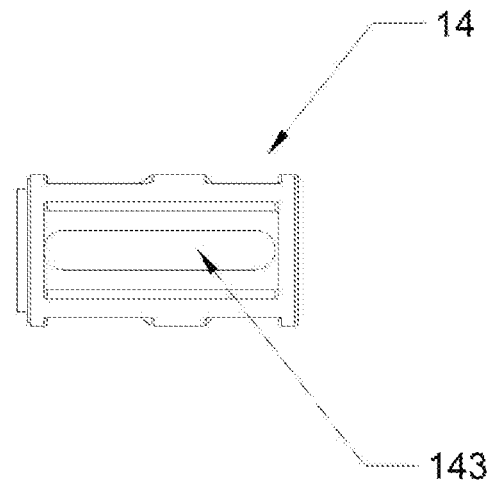
FIG. 10 is a schematic diagram of a liquid output channel of a column of an ultrasonic liquid concentration detecting device according to one embodiment.

As illustrated in FIG. 10, the function of accelerating the guidance of a liquid should be achieved at the probe 1 of the ultrasonic liquid concentration detecting device, as described above about the structure of the flow guidance and ejection part; meanwhile, in order to ensure that the liquid can form an ejection flow in the column 14, a rectangular through hole is defined in the wall of the column of the column 14 in the present embodiment. The through hole achieves the intersection of the liquid in the column and the solution to be measured outside the column, and a liquid flowing channel is also provided.

Figure 12:
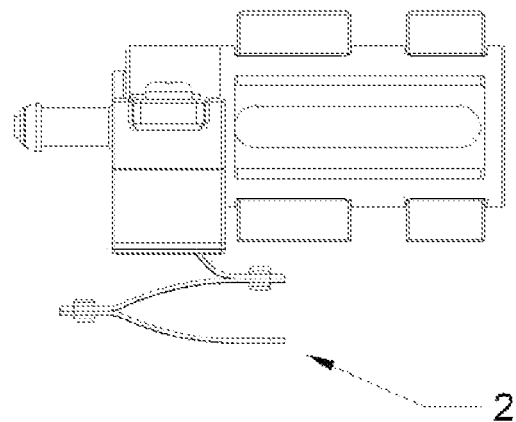
FIG. 12 is a mounting layout diagram of a vibrating structure of an ultrasonic liquid concentration detecting device according to one embodiment.

As illustrated in FIG. 12, the probe 1 of the ultrasonic liquid concentration detecting device is connected with the vibrating structure 2 through the probe mounting base, where the connection direction of the vibrating body 2 is selectable. Optionally, the mounting direction in the present embodiment is mounted at the right side. Optionally, the vibrating body 2 has two interfaces, and the upper layer elastic sheet is installed first. The elastic sheet is designed with an upper connecting surface 21 connected with the probe mounting base, two connecting holes are formed in the upper connecting surface, and the upper connecting surface is fastened on the mounting base through the anti-reverse screws. The mounting direction is that the non-connecting end of the upper layer elastic sheet is in the same direction with the end of the ultrasonic reflective sheet 13 of the column 14 of the probe 1. Then a bottom layer elastic sheet is installed, the elastic plate is designed with a lower connecting surface 24 of a base of the whole probe 1 connected with the ultrasonic liquid concentration detecting device, two connecting holes are formed in the lower connecting surface 24, and the lower connecting surface 24 is fastened on the base through the anti-reverse screws. As illustrated in FIGS. 1 to 3, an ultrasonic liquid concentration detecting device includes an ultrasonic liquid concentration detecting device probe 1, a probe 1 mounting base 3, an vibrating body 2, a first flow guidance and ejection portion 4 and a second flow guidance and ejection portion 5.

The probe 1 is designed as an integrated engineering plastic part, and the core part of the ultrasonic liquid concentration detecting device, namely the ultrasonic generator 11, is wrapped by the engineered plastic; the ultrasonic reflective sheet 13, which is a key functional part of the ultrasonic liquid concentration detecting device, is embedded into the column 14.

Optionally, the ultrasonic generator 11 is injection molded by an engineered plastic through an embedded mold, and embedded into the ultrasonic generator base 17. The tail signal transmission line 16 of the ultrasonic generator is also embedded into the ultrasonic generator base 17; the column 14 is also injection molded by an embedded mold, and the embedded hardware material is the ultrasonic reflective sheet 13.

The column 14 embedded with the ultrasonic reflective sheet 13 and the ultrasonic base 17 wrapped with the ultrasonic generator 11 are disposed by an ultrasonic welding tool, welded by an ultrasonic heating process and finally connected into a whole. Thus, the core functional electronic elements of the ultrasonic solution concentration detecting device are integrated in the probe 1, and the emission, transmission, reflection and reception of ultrasonic waves are realized.

The probe 1 is connected to the probe mounting base 3 by means of screws.

Optionally, in the horizontal direction of the probe 1, two wings extending outwards are disposed on two sides of the ultrasonic generator base 17, female slots for receiving the two wings of the probe 1 are provided on two sides of the two wings and the probe mounting base 3, and the two wings and the female slots are matched with each other in a male-female mode. On the basis of the matching of the male and female grooves, the male and female grooves are locked through self-tapping screws. Therefore, an intermediate link connected with the outside is provided through the probe mounting base 3, the future serialization design of the product can be flexibly realized, and meanwhile, a fastening interface of the probe 1 in the ultrasonic liquid concentration detecting device is also provided.

The bottom surface of the mounting base 3 is designed with a plane for mounting the vibrating body 2. The upper connecting surface 21 of the vibrating body 2 is fastened by anti-reverse double screws on the bottom surface of the mounting base, and the lower connecting surface 24 below the vibrating body 2 is also connected to a base fixing plate of the ultrasonic liquid concentration detecting device through two anti-reverse screws. Thus, the probe 1, the probe mounting base 3 and the vibrating body 2 are connected with the ultrasonic liquid concentration detecting device into a whole.

As illustrated in FIGS. 4 and 5, the overall structure of the vibrating body 2 includes three elastic sheets 26, and antiverse screws connecting the three elastic sheets. Optionally, the three elastic sheets are formed by precision cold stamping the same stainless steel material. The upper layer, the middle layer and the bottom layer are all formed by a punching process through a cold punching die. Optionally, the process includes blanking, punching, stamping, shaping, and the like.

All three elastic sheets 26 are tightened by anti-reverse screws, so that an integral vibrating body 2 is formed. It should be noted that, when connecting the three elastic sheets 26, the direction of the elastic sheets 26 should be designed so as to avoid the mutual interference of the elastic regions 23 of the elastic sheets 26.

As illustrated in FIGS. 6 to 9, in the probe 1 of the ultrasonic liquid concentration detecting device, four flow guidance and ejection portions are distributed on the top and the bottom of the probe 1 in the vertical direction. A first flow guidance and ejection portions 4 adjacent to one end of an ultrasonic generator 11 are designed as slightly larger, a second flow guidance and ejection portions 5 adjacent to an ultrasonic reflector 13 are designed as slightly smaller, and the four flow guidance and ejection portions and the probe 1 are connected into a whole on a column 14.

Optionally, the first flow guidance and ejection portions 4 and the second flow guidance and ejection portions 5 are both funnel-shaped. The main body of the flow guidance and ejection portion is a funnel area, and the tail part of the flow guidance and ejection portion consists of a flow guidance channel and an ejection outlet. The flow guidance and ejection part is made of the same material as the column 14 and is made through an injection molding process. A liquid flow channel in the whole flow guidance and ejection part is designed into a structure with a large upper part and a small lower part, so that the flow guidance and ejection part can be conveniently made by adopting a mold core-pulling mode during molding.

As illustrated in FIGS. 7 and 9, the first flow guidance and ejection portions 4 and the second flow guidance and ejection portions 5 of the ultrasonic liquid concentration detecting device are each designed as a curved surface which is in a circular arc shape and attached to the cylindrical outer part of the column 14 at the bottom of the funnel area of the flow guidance and ejection part. The vertical downward and the ascending direction of curved surface have been configured with a weld line made by ultrasonic welding, and so the welding of two flow guidance and ejection portions of the same type can be achieved through the ultrasonic welding tool positioning mode and heating ultrasonic energy.

Figure 11:
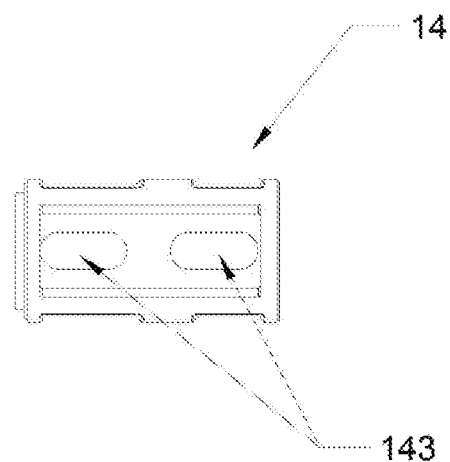
FIG. 11 is a schematic diagram of a liquid output channel of a column of an ultrasonic liquid concentration detecting device according to one embodiment.

As illustrated in FIG. 11, the function of accelerating the diversion of liquid should be achieved at the probe 1 of the ultrasonic liquid concentration detecting device, as described above about the structure of the flow guidance and ejection part; meanwhile, in order to ensure that the liquid can form an ejection flow in the column 14, two circular through hole is formed in the wall of the column of the column 1 in the present embodiment. The two through holes are adjacent to the first flow guidance and ejection portions 4 and the second flow guidance and ejection portions 5 respectively. The through hole achieves the intersection of the liquid in the column and the solution to be measured outside the column, and a liquid flowing channel is also provided.

Figure 13:
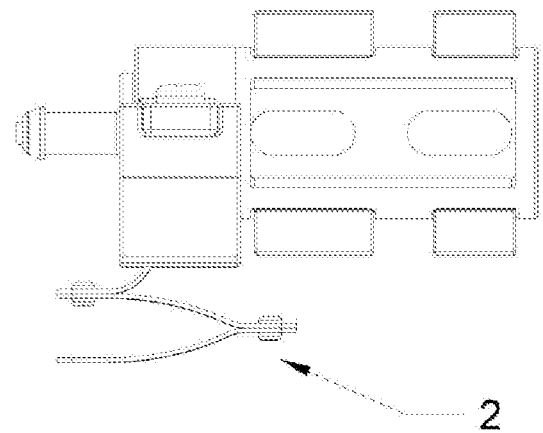
FIG. 13 is a mounting layout diagram of a vibrating structure of an ultrasonic liquid concentration detecting device according to one embodiment.

As illustrated in FIG. 13, the probe 1 of the ultrasonic liquid concentration detecting device is connected with the vibrating body 2 through the probe mounting base, where the connection direction of the vibrating body 2 is selectable. Optionally, the mounting direction in the present embodiment is mounted on the left side. Optionally, the vibrating body 2 has two interfaces, and the upper layer of the elastic sheet is installed first. The elastic sheet is designed with an upper connecting surface 21 connected with the probe mounting base, two connecting holes are formed in the upper connecting surface, and the upper connecting surface is fastened on the mounting base through the anti-reverse screws. The mounting direction is that the non-connecting end of the upper layer elastic sheet is in the opposite direction with the ultrasonic reflecting/receiving end 111 of the column 14 of the probe 1. Then a bottom layer elastic sheet is installed, the elastic plate is designed with a lower connecting surface 24 of a base of the whole probe 1 connected with the ultrasonic liquid concentration detecting device, two connecting holes are formed in the lower connecting surface 24, and the lower connecting surface 24 is fastened on the base through the anti-reverse screws.

INDUSTRIAL APPLICABILITY

The present disclosure provides an ultrasonic liquid concentration detecting device, which protects an ultrasonic generating device and a probe of the ultrasonic liquid concentration detecting device, prolongs the service life of the probe of the ultrasonic liquid concentration detecting device, and improves the precision of the ultrasonic liquid concentration detecting device.

What is claimed is:

1. An ultrasonic liquid concentration detecting device, comprising:
   a vibrating structure;
   a bubble removing structure; and
   an ultrasonic detecting main body,
   wherein the vibrating structure is disposed at a bottom of the ultrasonic detecting main body and is configured to buffer a shock received by the ultrasonic detecting main body,
   wherein the bubble removing structure is disposed on the ultrasonic detecting main body and is configured to accelerate a flow rate of a liquid,
   wherein the ultrasonic detecting main body is configured to detect a concentration of the liquid,
   wherein the vibrating structure comprises an upper connecting surface joined with a bottom surface of a probe mounting base, a lower connecting surface integrated with the ultrasonic liquid concentration detecting device, and three elastic sheets connected end to end,
   wherein the three elastic sheets are arranged in a stack form, and ends of the three elastic sheets are connected together through locking screws making the three elastic sheets form a firm whole, and
   wherein each of the three elastic sheets is provided with an elastic region, and the elastic region is provided with a clearance hole and an elastic curvature which are configured for adjusting an elastic coefficient of the elastic sheet.

2. The ultrasonic liquid concentration detecting device of claim 1, wherein the ultrasonic detecting main body comprises a probe of an ultrasonic wave emitting and receiving device, the probe comprising:
an ultrasonic generator base, an ultrasonic generator, a sealing ring, an ultrasonic generator compressing disc, an ultrasonic reflective sheet, a column, and a signal transmission line.

3. The ultrasonic liquid concentration detecting device of claim 2, wherein the ultrasonic generator base is integrated with the ultrasonic generator by injection molding and the signal transmission line is integrated in the ultrasonic generator base.

4. The ultrasonic liquid concentration detecting device of claim 2,
wherein the ultrasonic generator base and the column are made of a same material thus maintaining a same thermal expansion coefficient after the ultrasonic generator base and the column are connected and secured to each other,
wherein the signal transmission line is made of a material resistant to a high temperature of 150 to 300° C. thus avoiding melting during a molding operation,
wherein the ultrasonic reflective sheet is embedded in the column, and is made of stainless steel, wherein a reflective surface of the ultrasonic reflective sheet is polished, preventing the reflective surface from turning rough due to rusting after being immersed in a solution for a long time which otherwise results in attenuation of reflected signals.

5. The ultrasonic liquid concentration detecting device of claim 2, wherein a non-reflective surface of the ultrasonic reflective sheet is provided with grooves to increase an adhesive force in injection molding, preventing formation of double-wave diffraction and interference during reflection of ultrasonic waves which otherwise causes signal attenuation.

6. The ultrasonic liquid concentration detecting device of claim 1,
wherein the bubble removing structure comprises a flow guidance and ejection part, the flow guidance and ejection part comprising a funnel inlet, a flow guiding inlet, a flow guidance channel, an ejection outlet, and a weld line,
wherein the flow guidance and ejection part comprises two first flow guidance and ejection portions disposed at a top and a bottom of the ultrasonic liquid concentration detecting device respectively and two second flow guidance and ejection portions disposed at the top and the bottom of the ultrasonic liquid concentration detecting device respectively,
wherein the ejection outlets of the two first flow guidance and ejection portions both aim at an ultrasonic emitting/receiving surface of the ultrasonic generator, and the ejection outlets of the two second flow guidance and ejection portions both aim at a reflective surface of an ultrasonic reflective sheet.

7. The ultrasonic liquid concentration detecting device of claim 2, wherein the flow guidance and ejection part is welded to the column, and in a surface of the column is provided a rectangular opening along an axis of the column thus providing a liquid output channel when the flow guidance and ejection part ejects the liquid.

8. The ultrasonic liquid concentration detecting device of claim 6,
wherein each of the first and second flow guidance and ejection portions is funnel-shaped, wherein the flow guiding inlet of the funnel-shaped flow guidance and ejection portion has a relatively small caliber, and the funnel inlet of the funnel-shaped flow guidance and ejection portion has a relatively large caliber,
wherein the flow guidance channel is coplanar with the funnel inlet of the funnel-shaped flow guidance and ejection portion on three planes, allowing a guided liquid to enter the flow guidance channel from the flow guiding inlet,
wherein the ejection outlet is formed in a trumpet shape relative to the flow guidance channel thus forming a flared trumpet-shaped outlet, so that resistance in the flow guidance channel is suddenly released increasing the flow rate of the liquid.

9. A vibrating structure, comprising:
an upper connecting surface joined with a bottom surface of a probe mounting base;
a lower connecting surface integrated with an ultrasonic liquid concentration detecting device; and
three elastic sheets connected end to end,
wherein the three elastic sheets are connected end to end in a stack form, and ends of the three elastic sheets are connected together through locking screws to form a firm whole, and
wherein each of the three elastic sheets is provided with an elastic region, and the elastic region is provided with a clearance hole and an elastic curvature which are configured for adjusting an elastic coefficient of the three elastic sheets.

10. A bubble removing structure, comprising:
a flow guidance and ejection part, which comprises first flow guidance and ejection portions and second flow guidance and ejection portions,
wherein the first flow guidance and ejection portions each comprise a first funnel inlet, a first flow guiding inlet, a first flow guidance channel, a first ejection outlet, and a weld line,
the second flow guidance and ejection portions each comprise a second funnel inlet, a second flow guiding inlet, a second flow guidance channel, a second ejection outlet, and a second weld line,
wherein the first ejection outlets of the first flow guidance and ejection portion disposed above an ultrasonic liquid concentration detecting device and of the first flow guidance and ejection portion disposed below the ultrasonic liquid concentration detecting device both aim at an ultrasonic emitting/receiving surface of an ultrasonic generator, and
wherein the second ejection outlets of the second flow guidance and ejection portion disposed above the ultrasonic liquid concentration detecting device and of the second flow guidance and ejection portion disposed below the ultrasonic liquid concentration detecting device both aim at a reflective surface of an ultrasonic reflective sheet.

11. The ultrasonic liquid concentration detecting device of claim 1, wherein the ultrasonic detecting main body comprises a probe of an ultrasonic wave emitting and receiving device, the probe comprising:
an ultrasonic generator base, an ultrasonic generator, a sealing ring, an ultrasonic generator compressing disc, an ultrasonic reflective sheet, a column, and a signal transmission line.

12. The ultrasonic liquid concentration detecting device of claim 3, wherein the ultrasonic generator base and the column are made of a same material thus maintaining a same thermal expansion coefficient after the ultrasonic generator base and the column are connected and secured to each other, wherein the signal transmission line is made of a material resistant to a high temperature of 150 to 300° C. thus avoiding melting during a molding operation, wherein the ultrasonic reflective sheet is embedded in the column, and is made of stainless steel, wherein a reflective surface of the ultrasonic reflective sheet is polished, preventing the reflective surface from turning rough due to rusting after being immersed in a solution for a long time which otherwise results in attenuation of reflected signals.

13. The ultrasonic liquid concentration detecting device of claim 3, wherein a non-reflective surface of the ultrasonic reflective sheet is provided with grooves to increase an adhesive force in injection molding, preventing formation of double-wave diffraction and interference during reflection of ultrasonic waves which otherwise causes signal attenuation.

14. The ultrasonic liquid concentration detecting device of claim 4, wherein a non-reflective surface of the ultrasonic reflective sheet is provided with grooves to increase an adhesive force in injection molding, preventing formation of double-wave diffraction and interference during reflection of ultrasonic waves which otherwise causes signal attenuation.

15. The ultrasonic liquid concentration detecting device of claim 1, wherein the bubble removing structure comprises a flow guidance and ejection part, the flow guidance and ejection part comprising a funnel inlet, a flow guiding inlet, a flow guidance channel, an ejection outlet, and a weld line, wherein the flow guidance and ejection part comprises two first flow guidance and ejection portions disposed at a top and a bottom of the ultrasonic liquid concentration detecting device respectively and two second flow guidance and ejection portions disposed at the top and the bottom of the ultrasonic liquid concentration detecting device respectively, wherein the ejection outlets of the two first flow guidance and ejection portions both aim at an ultrasonic emitting/receiving surface of the ultrasonic generator, and the ejection outlets of the two second flow guidance and ejection portions both aim at a reflective surface of an ultrasonic reflective sheet.

16. The ultrasonic liquid concentration detecting device of claim 2, wherein the bubble removing structure comprises a flow guidance and ejection part, the flow guidance and ejection part comprising a funnel inlet, a flow guiding inlet, a flow guidance channel, an ejection outlet, and a weld line, wherein the flow guidance and ejection part comprises two first flow guidance and ejection portions disposed at a top and a bottom of the ultrasonic liquid concentration detecting device respectively and two second flow guidance and ejection portions disposed at the top and the bottom of the ultrasonic liquid concentration detecting device respectively, wherein the ejection outlets of the two first flow guidance and ejection portions both aim at an ultrasonic emitting/receiving surface of the ultrasonic generator, and the ejection outlets of the two second flow guidance and ejection portions both aim at a reflective surface of an ultrasonic reflective sheet.

17. The ultrasonic liquid concentration detecting device of claim 3, wherein the bubble removing structure comprises a flow guidance and ejection part, the flow guidance and ejection part comprising a funnel inlet, a flow guiding inlet, a flow guidance channel, an ejection outlet, and a weld line, wherein the flow guidance and ejection part comprises two first flow guidance and ejection portions disposed at a top and a bottom of the ultrasonic liquid concentration detecting device respectively and two second flow guidance and ejection portions disposed at the top and the bottom of the ultrasonic liquid concentration detecting device respectively, wherein the ejection outlets of the two first flow guidance and ejection portions both aim at an ultrasonic emitting/receiving surface of the ultrasonic generator, and the ejection outlets of the two second flow guidance and ejection portions both aim at a reflective surface of an ultrasonic reflective sheet.

18. The ultrasonic liquid concentration detecting device of claim 4, wherein the bubble removing structure comprises a flow guidance and ejection part, the flow guidance and ejection part comprising a funnel inlet, a flow guiding inlet, a flow guidance channel, an ejection outlet, and a weld line, wherein the flow guidance and ejection part comprises two first flow guidance and ejection portions disposed at a top and a bottom of the ultrasonic liquid concentration detecting device respectively and two second flow guidance and ejection portions disposed at the top and the bottom of the ultrasonic liquid concentration detecting device respectively, wherein the ejection outlets of the two first flow guidance and ejection portions both aim at an ultrasonic emitting/receiving surface of the ultrasonic generator, and the ejection outlets of the two second flow guidance and ejection portions both aim at a reflective surface of an ultrasonic reflective sheet.

19. The ultrasonic liquid concentration detecting device of claim 6, wherein the flow guidance and ejection part is welded to the column, and in a surface of the column is provided a rectangular opening along an axis of the column thus providing a liquid output channel when the flow guidance and ejection part ejects the liquid.

* * * * *